April 19, 1938.  L. A. BABIN  2,114,698
BROILER MECHANISM
Filed April 1, 1936   6 Sheets-Sheet 3
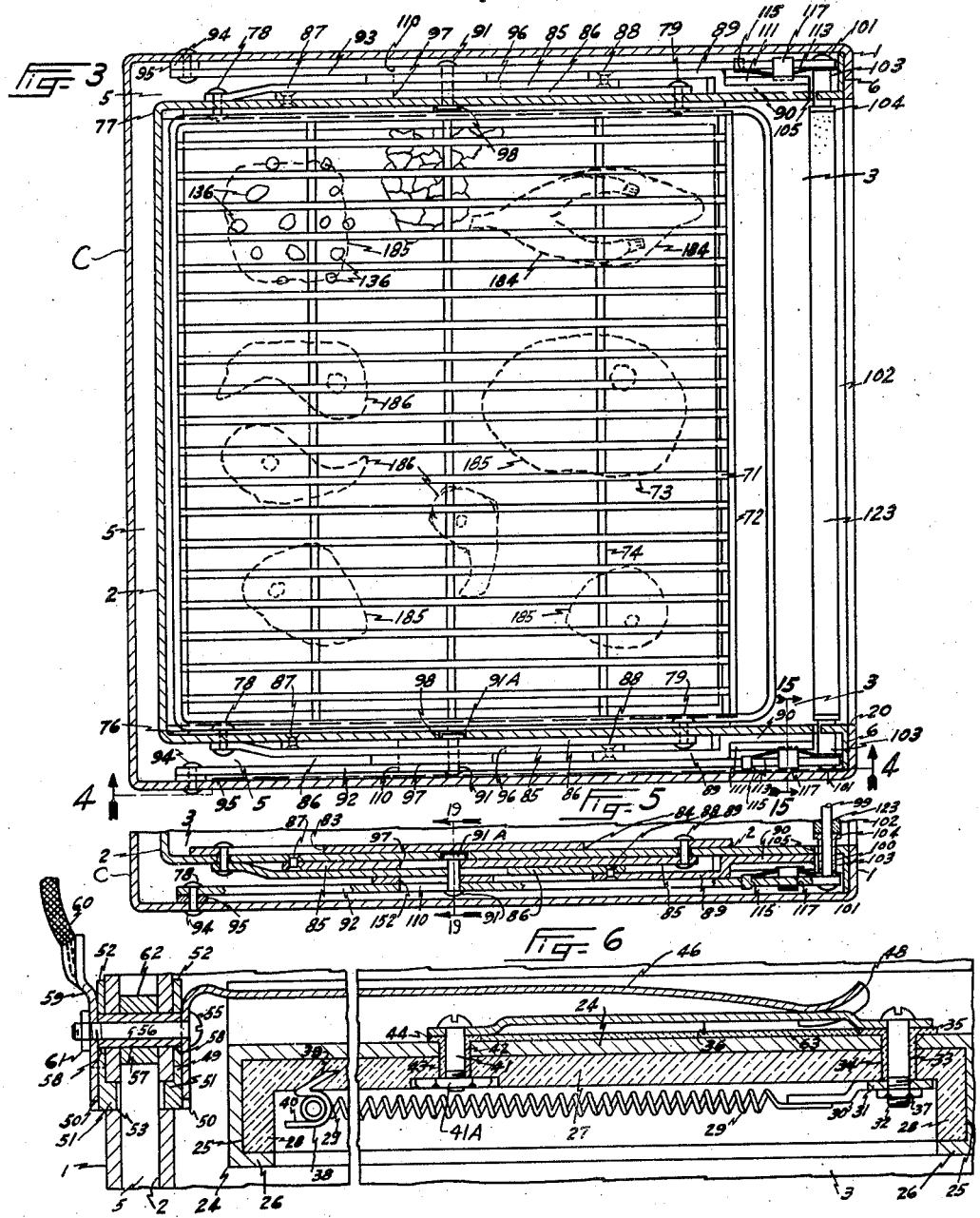
INVENTOR.
Louis Albert Babin
BY
George B. Ingersoll
ATTORNEY.

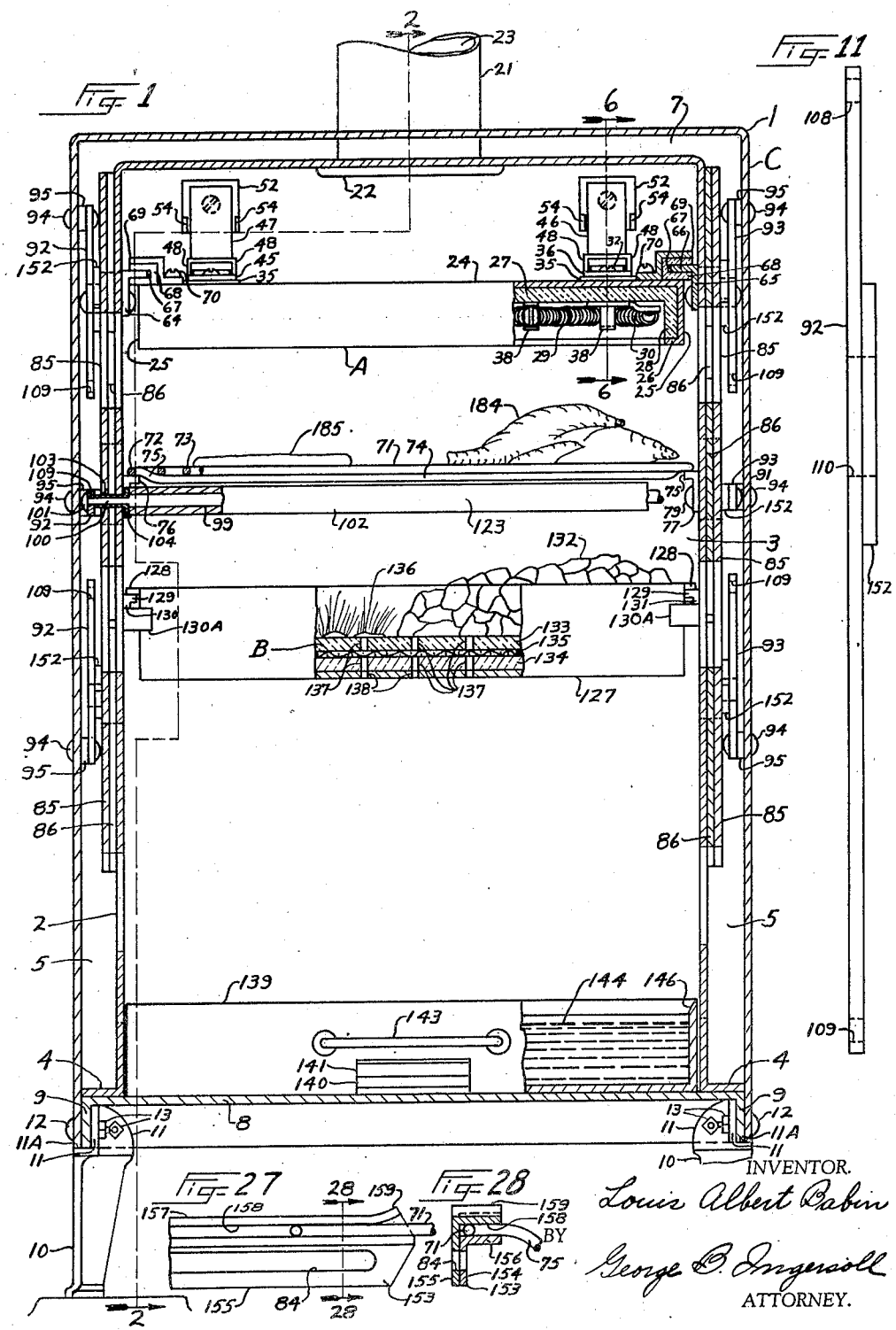

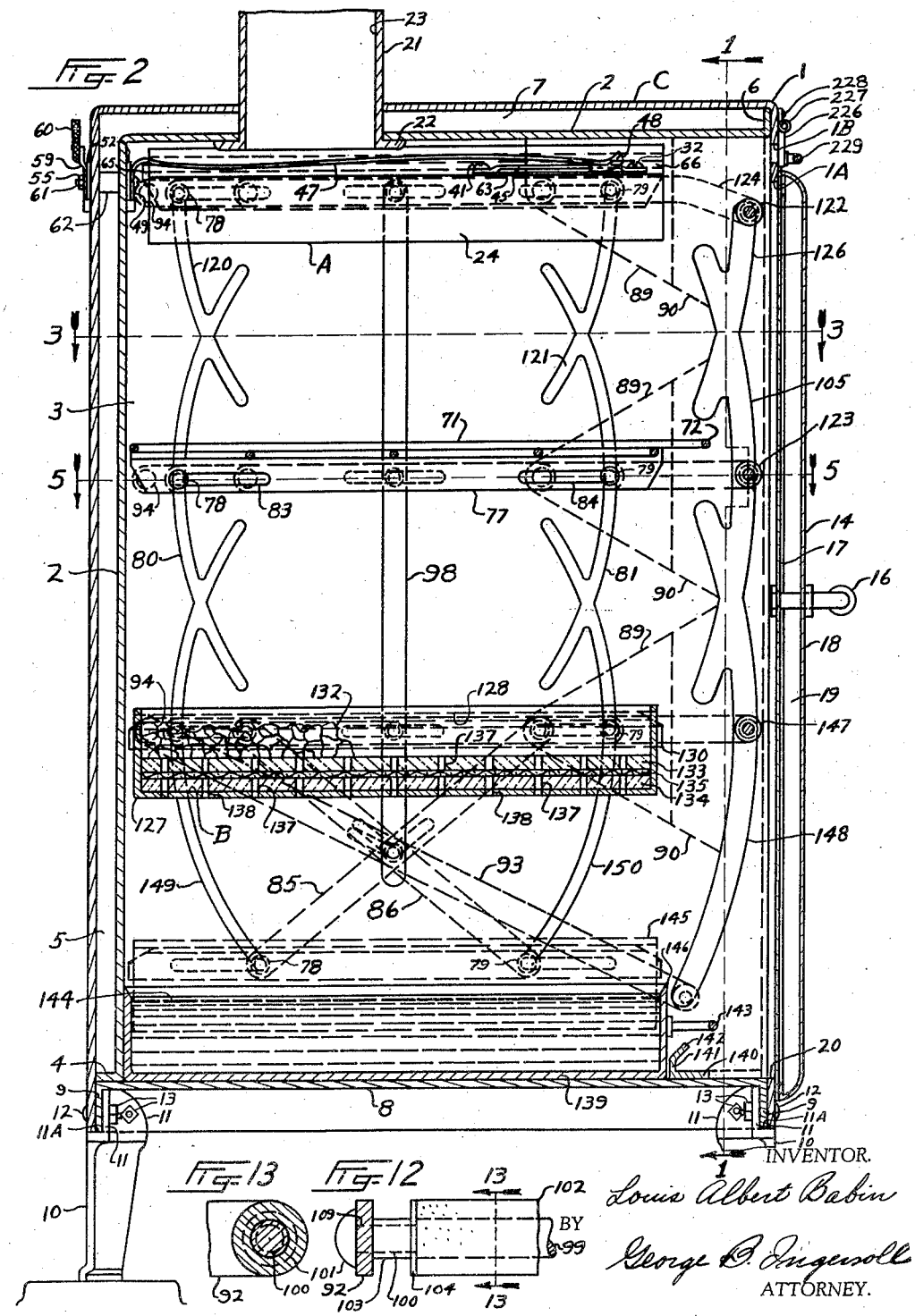

April 19, 1938.  L. A. BABIN  2,114,698
BROILER MECHANISM
Filed April 1, 1936  6 Sheets-Sheet 4
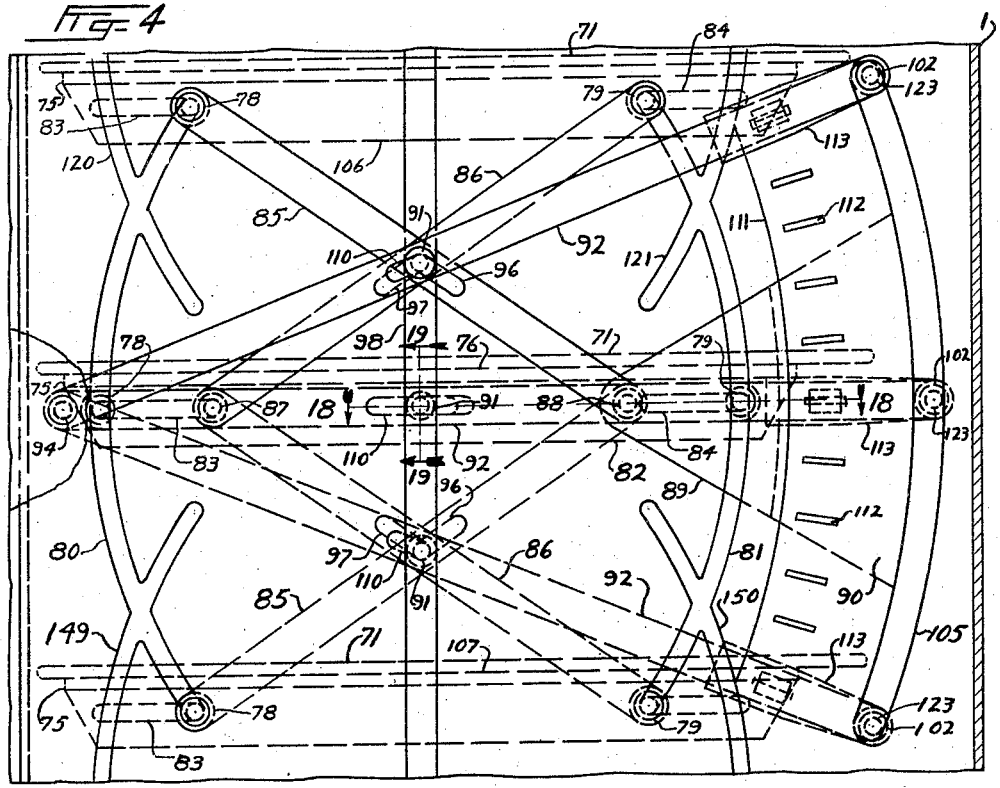
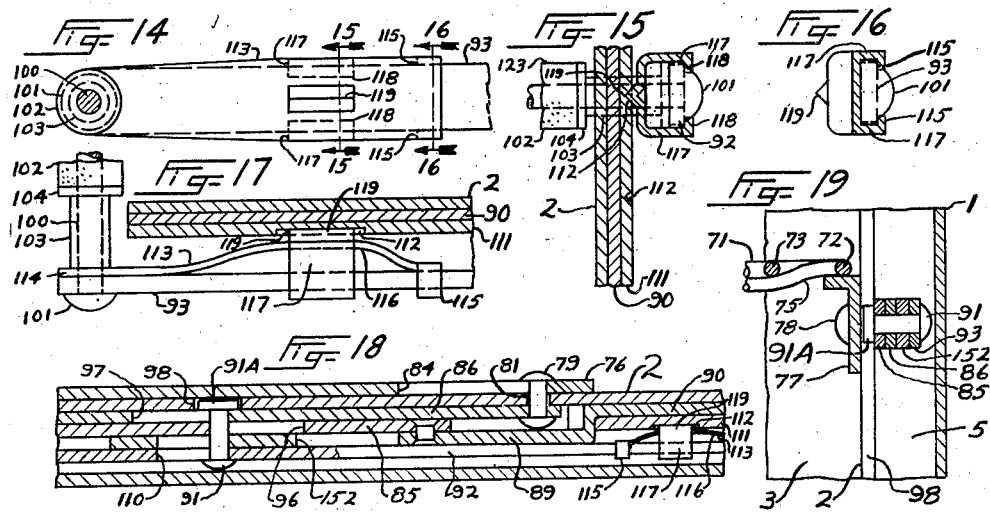
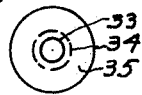
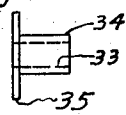
INVENTOR.
Louis Albert Babin
BY
George O. Ingersoll
ATTORNEY.

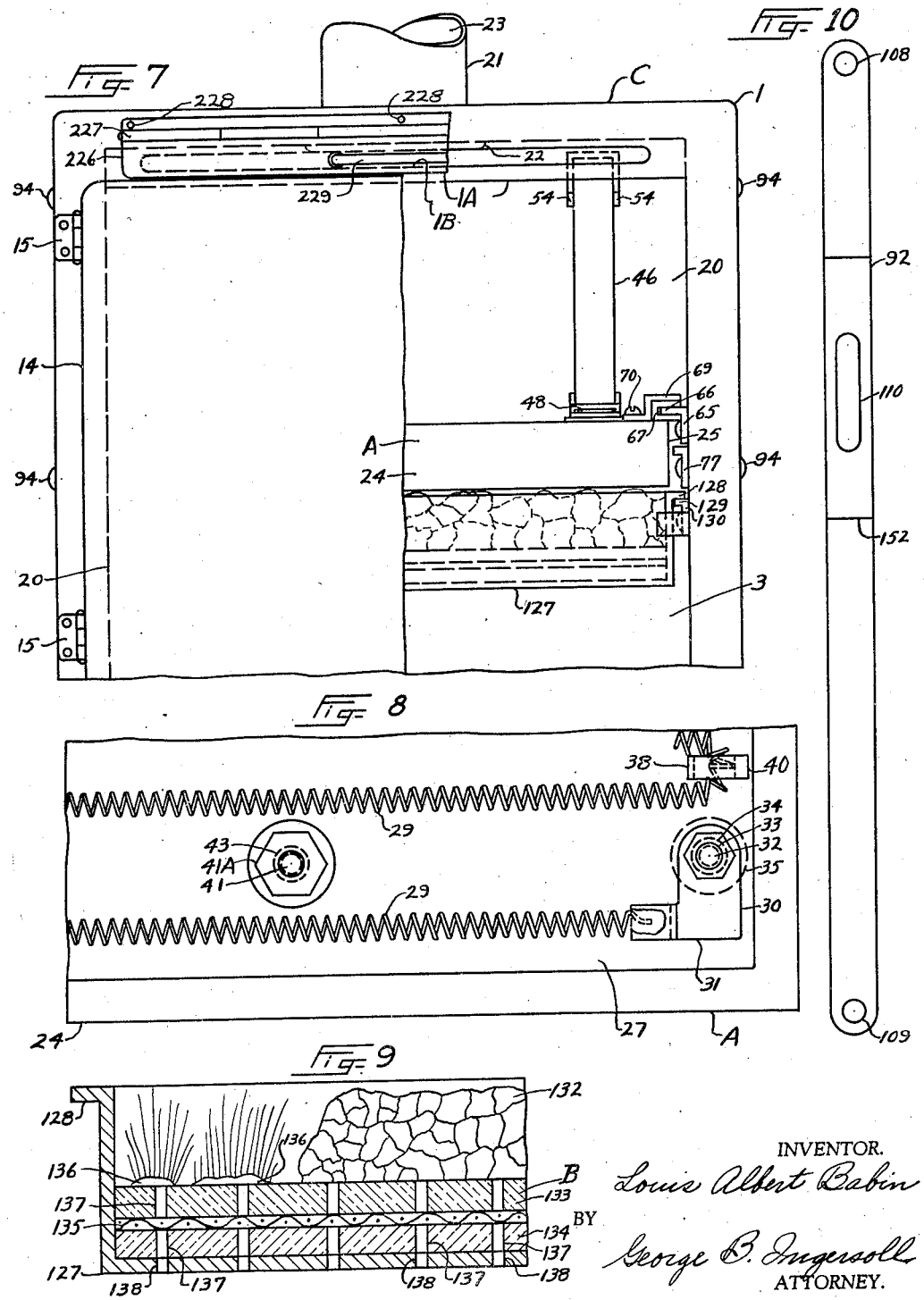

April 19, 1938.   L. A. BABIN   2,114,698
BROILER MECHANISM
Filed April 1, 1936   6 Sheets-Sheet 6
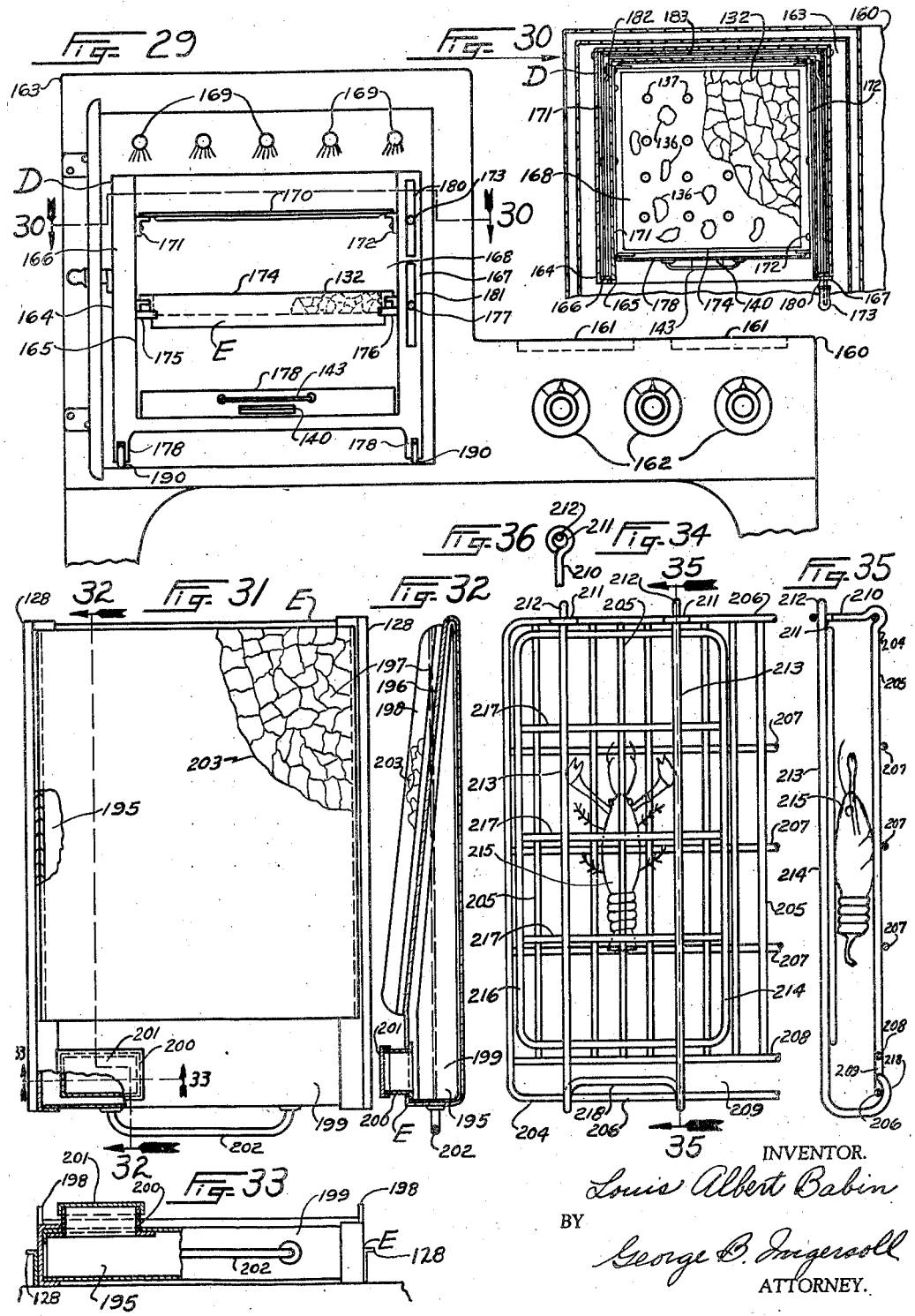
INVENTOR.
Louis Albert Babin
BY
George B. Ingersoll
ATTORNEY.

Patented Apr. 19, 1938

2,114,698

UNITED STATES PATENT OFFICE 2,114,698

BROILER MECHANISM

Louis Albert Babin, Dearborn, Mich.

Application April 1, 1936, Serial No. 72,079

12 Claims. (Cl. 126—14)

My invention relates to improvements in broiler mechanisms used in cooking operations, and the objects of my improvements are, first, to provide a broiler mechanism having means for adjustably positioning a burner or heat developing element to and from the substance or unit to be cooked; second, to provide a broiler mechanism having a cooking element located above the substance or unit to be cooked and a charcoal or similar fuel burning mechanism located below the substance or unit to be cooked; third, to provide a broiler mechanism having a cooking unit with contact mechanism adapted to operate therewith when said cooking unit is being adjustably moved to different heating or cooking positions; fourth, to provide a grill mechanism for a broiler mechanism and adapted for supporting the substance or unit being cooked with support means enabling the grill mechanism to be supported therein when in a partially removed position in the broiler mechanism; fifth, to provide a broiler mechanism with a cooking unit having means for utilizing the drippings of fat from the substance or unit being cooked, as fuel in the cooking operations; sixth, to provide a broiler mechanism utilizing drippings of fat from the substance being cooked as fuel with means for causing the drippings to burn slowly to prevent excessive flames and rapid combustion; seventh, to provide a broiler mechanism having a fuel supporting mechanism with means for dampening or soaking the fuel to provide slow burning of the fuel; eighth, to provide a broiler mechanism with a fuel supporting member adjustably mounted and adapted to be moved into a body of water or similar material to dampen or soak the fuel to provide slow burning of the fuel; ninth, to provide a broiler mechanism having a perforated or honeycomb member for supporting the fuel to facilitate absorption of liquids to provide a slow burning of the fuel; tenth, to provide a broiler mechanism utilizing charcoal or similar fuel together with a burner mechanism with means permitting the charcoal and heating element to be adjustably moved adjacent one another to ignite the charcoal from the heating element; eleventh, to provide a broiler mechanism having adjustably mounted grill and burner members with index mechanism to position the grill and burner members in their adjusted positions; twelfth, to provide a broiler mechanism with a composition or solution adapted to control the fuel used in the broiler mechanism to burn more slowly; thirteenth, to provide a portable broiler mechanism; fourteenth, to provide a broiler mechanism for installation in conjunction with heating mechanism equipment of an oven of a household stove or similar cooking unit; fifteenth, to provide a broiler mechanism with means for supporting charcoal or similar fuel during combustion and comprising a container for water or similar liquids adapted to prevent excessive heat and rapid burning of said charcoal or similar fuel; sixteenth, to provide a broiler mechanism having means for supporting charcoal or similar fuel during combustion in an inclined position relative to a substance or unit being cooked to permit the varying of the speed of cooking in accordance with the position of the charcoal or similar fuel on the support means; seventeenth, to provide a broiler mechanism with grill means adapted to clamp a lobster or similar unit during the cooking operation; eighteenth, to provide a grill mechanism for a broiler mechanism and provided with clamp means adapted for ready and optional placement on the broiler mechanism to hold the substance or unit during the cooking operation; and nineteenth, to provide a broiler mechanism with ventilating control means to prevent smoking of the broiler mechanism.

I attain these objects by the mechanism illustrated in the accompanying drawings, in which:—

Figure 1 is a vertical section through the broiler mechanism, said sectional view being taken on the line 1—1, Fig. 2; Fig. 2, a sectional view of the broiler mechanism taken on the line 2—2, Fig. 1; Fig. 3, a sectional view of the broiler mechanism taken on the line 3—3, Fig. 2 and without disclosing the door mechanism; Fig. 4, a partial sectional view of the broiler mechanism taken on the line 4—4, Fig. 3, and disclosing the lever mechanism for adjusting the grill mechanism to various positions; Fig. 5, a partial sectional view of the broiler mechanism taken on the line 5—5, Fig. 2; Fig. 6, a partial sectional view of the broiler mechanism taken on the line 6—6, Fig. 1; Fig. 7, a partial side view of the broiler mechanism disclosing the door partially broken away to show an electrical burner or coil element adjusted to a position adjacent the receptacle for supporting the charcoal used in the burner mechanism; Fig. 8, a partial bottom view of the broiler mechanism disclosing the electrical burner or coil element; Fig. 9, a partial vertical section through the charcoal heating unit and drawn to an enlarged scale to more fully disclose the construction thereof; Fig. 10, a side view of one of the levers for operating the raising and lowering mechanisms; Fig. 11, a side view of the lever disclosed in Fig. 10; Fig. 12, a partial side view of one of the handle members for operating the raising and lowering mechanisms; Fig. 13, a sectional view of the handle member taken on the line 13—13, Fig. 12; Fig. 14, a partial side view of one of the levers for operating the raising and lowering mechanisms together with an index plunger mechanism mounted thereon; Fig. 15, a partial sectional view of the lever and index plunger mechanism disclosed in Fig. 14 together with a rack member for engagement with the index plunger mechanism, said partial sectional view being taken on the line 15—15, Figs. 3 and 14; Fig. 16, a sectional view of the lever and index plunger mechanism disclosed in Fig. 14 and taken on the line 16—16, Fig. 14; Fig. 17, a bottom view of the lever, index plunger and rack mechanisms disclosed in Fig. 14, said bottom view disclosing sectional wall portions of the housing and brackets; Fig. 18, a partial sectional view of one of the raising and lowering mechanisms taken on the line 18—18, Fig. 4; Fig. 19, a partial sectional view of the grill support mechanism taken on the line 19—19, Figs. 4 and 5; Fig. 20, a front view of one of a plurality of insulation members for mounting one of the electrical contact members of the broiler mechanism; Fig. 21, a side view of the insulation member disclosed in Fig. 20; Fig. 22, a sectional view of the insulation member disclosed in Figs. 20 and 21, said sectional view being taken on the line 22—22, Fig. 20; Fig. 23, an end view of one of the insulator bushings used in the support mechanism for one of the electrical contact members of the broiler mechanism; Fig. 24, a side view of the insulator bushing disclosed in Fig. 23; Fig. 25, an end view of one of the insulator bushings used in the support mechanism for one of the electrical contact members of the broiler mechanism; Fig. 26, a side view of the insulator bushing disclosed in Fig. 25; Fig. 27, a partial side view of an alternate support construction for the grill member of the broiler mechanism; Fig. 28, a sectional view of the grill support construction disclosed in Fig. 27, said sectional view being taken on the line 28—28, Fig. 27; Fig. 29, a view disclosing my broiler mechanism adapted as a portable unit for use as a household unit in conjunction with the oven of a conventional cook stove forming part of the equipment of a household; Fig. 30, a sectional view of the portable broiler mechanism disclosed in Fig. 29, said sectional view being taken on the line 30—30, Fig. 29; Fig. 31, a plan view of a member for supporting fuel in the broiler mechanism and incorporating a container or tank for holding water or similar liquid; Fig. 32, a sectional view of the member for supporting fuel, disclosed in Fig. 31, said sectional view being taken on the line 32—32, Fig. 31; Fig. 33, a combined end and partial sectional view of the member for supporting fuel, disclosed in Fig. 31, said partial sectional view being taken on the line 33—33, Fig. 31; Fig. 34, a plan view of a grill mechanism provided with clamp means for holding a substance or unit during the cooking operation; Fig. 35, a sectional view of the grill mechanism disclosed in Fig. 34, said sectional view being taken on the line 35—35, Fig. 34; and Fig. 36, a partial end view of the grill mechanism disclosed in Fig. 34.

Similar numerals refer to similar parts throughout the several views.

It is to be noted that my invention as disclosed in this present application is similar to that disclosed in my pending application for United States Letters Patent, Serial No. 36,218, filed August 14, 1935 for Broiler, but with improvements incorporated therein.

The housing 1 forms the range or stove body of the broiler mechanism assembly C and is provided with the inner housing 2 which is provided with the chamber 3 which forms the heating or cooking compartment of the broiler mechanism. The side wall portions of the inner housing 2 are provided with the flange portions 4 at its lower side and which extend at right angles to the main side wall portions of the outer housing 1 to space the inner housing 2 from the wall portions of the outer housing 1 and to provide the spaces 5 between the side wall portions of the inner and outer housings 1 and 2.

The broiler mechanism assembly C is provided with a flange 1A having an opening 1B, preferably at its upper portion as disclosed in Fig. 2, to facilitate the entrance of fresh air or oxygen in proper quantities into the chamber 3 to provide proper combustion in the fuel forming operation and thus to eliminate the formation of smoke. Also should smoking occur, the opening 1B will provide means for the escape of the smoke. The opening 1B is closed or partially closed as desired to form proper ventilating control, by the door 226 pivotally supported by suitable hinges 227 secured to the housing 1 by suitable rivets 228, the door 226 being provided with a handle 229.

Also the upper wall portion of the inner housing 2 is provided with the flange portions 6 at its upper front sides and which extend at right angles with the main upper body portion of the inner housing 2 for engagement with the inner surfaces of the upper main wall portion of the outer housing 1 to space the top of the inner housing 2 from the upper wall portion of the outer housing 1 to provide the space 7 therebetween.

The lower wall of the heating or cooking compartment 3 is formed between the wall portion 8 which closes the lower side of the outer housing 1, the lower wall portion 8 being provided with the flange portions 9 for engaging the inner surfaces of the side wall portions of the outer housing 1.

The broiler mechanism C is provided with the leg or feet members 10 each of which is provided with the flange portion 11 which extends adjacent the flange portions 9 of the lower wall portion 8, the flange portions 11 being arranged substantially at right angles to one another to fit within the flange portions 9 at the lower side of the lower wall portion 8 and form shouldered surfaces 11A for engaging the edge surfaces of the flange portions 9 of the wall portion 8 together with the side wall portions of the outer housing 1, the flanges 11 and 9 being secured to the outer housing 1 by the bolts 12 and the nuts 13.

The broiler mechanism C is provided with the door member 14 which is pivotally supported on a plurality of hinges 15, Fig. 7, the door member 14 being provided with the handle 16, Fig. 2.

The door 14 comprises the inner wall portions 17 and the outer wall portion 18 which are secured together to provide the chamber or space 19 therebetween, the door 14 thus being adapted to close the open side or door opening 20 of the broiler mechanism C.

The broiler mechanism C is provided with the outlet or vent pipe 21 which is provided with the flange 22 for securement to the inside surface of the upper wall portion of the inner housing 2, the outlet or vent pipe 21 being provided with the passage 23 which thus connects with the heating or cooking compartment 3 to provide means for the escape of heat, fumes and vapors developed within the heating or cooking compartment 3.

The broiler mechanism C is provided with the heating or cooking element assembly A located in the upper portion of the heating or cooking compartment 3, the heating element assembly A being provided with the housing 24 which is provided with a closed wall portion at its upper side together with the flange portions 25 which extend substantially at right angles thereto and downwardly therefrom, the flanges 25 being extended at their lower sides to provide the flange portions 26 which extend substantially at right angles to the flange portion 25, the flange portions 26 forming a ledge or shelf construction which extends substantially entirely around the heating element assembly A.

The heating element assembly A is provided with the insulation member 27 which forms a housing extending around the inside of the housing 24, the insulation member 27 being provided with the flange portions 28 which extend substantially at right angles to its upper wall portion and engages and is retained by the flange portions 26 of the housing 24, the insulation member 27 thus being provided with an open lower side to permit the support of the heating or cooking element or coils 29 at said open side so that the heat developed by the heating coils 29 will be deflected downwardly in the cooking compartment 3.

The heating coils 29 are formed by suitable wires or cables adapted to conduct a flow of electrical current therethrough to cause them to be heated to develop the cooking means at the upper portion of the heating compartment 3.

The heating coils 29 will be extended by sufficient convoluted portions to provide a heating element substantially covering the total exposed area of the heating element assembly A and thus will provide means for developing heat over the entire cross sectional area at the upper portion of the cooking compartment 3.

One end or terminal of the heating coil or element 29 is connected to one of a pair of terminal members 30, one of which is disclosed in Figs. 6 and 8, the terminal members 30 each being provided with a flange portion 31 which connects with one of a pair of terminal screws 32, one of the terminal screws 32 extending through the bore 33 of one of a pair of bushings 34 which extend through suitable openings in the insulator member 27 and the upper wall portion of the housing 24, the bushings 34 each being provided with a flange 35 which engages the upper wall portion of the housing 24 and is also adapted to engage one end of each of the contact bars 36 and 45, the screws 32 extending through suitable openings in one end of the contact bars 36 and 45 and also through the bores 33 of the bushings 34 and between the flange portions 31 of the terminal members 30, one end of the contact bars 36 and 45 and the terminal members 30, together with the bushings 34 being retained by the nuts 37 threadably engaging the screws 32.

One of the bushings 34 is disclosed in detail in Figs. 25 and 26 and in its assembled position in Fig. 6.

The heating element or coils 29 may be supported at different points through its length by a plurality of clip members 38 each of which are provided with an extension portion 39 which may extend at an angle relative to the inner surface of the upper wall of the insulator member 27 and by insertion therein forms a support for the clip members 38, the clip members 38 each being further provided with the open side 40 into which fits and engages the coils 29 to form a support therefor and at the same time to provide for ready assembly or removal of the coils 29 from the clip members 38.

It is to be noted that the bushing members 34 and the member 27 will be constructed of suitable material such as asbestos or similar material having insulation characteristics and at the same time to provide characteristics to enable it to withstand the heat developed by the heating element or coils 29.

The contact bars 36 and 45 will each be retained at the other of their ends by the screws 41 which extend through suitable openings in ends of the contact bars 36 and 45 and also through the bores 42 of a pair of bushings 43, one of which is disclosed in Fig. 6, said bushings extending through suitable openings in the upper wall portion of the housing 24 and the insulator member 27, the screws 41 each being engaged and secured in position by a nut 41A which may be set flush with the inside surface of the insulator member 27, the bushings 43 each being provided with a flange 44 for separating the end of the contact bar 36 from the upper wall portion of the housing member 24.

It is thus to be noted that the contact bars 36 are securely retained at both of their ends and provide an electrical connection with one end of the heating elements or coils 29 through one of the screws 32 and terminal members 30.

It is also to be noted that the other end of the heating element or coils 29 will be connected in a similar way with the contact bar 45, thus providing terminal connections at opposite ends of the heating element or coils 29 to provide for the proper flow of electrical current therethrough.

The contact members 46 and 47 are constructed of resilient material adapted to withstand the heat developed in the heating compartment 3 and to provide necessary flexible characteristics to allow the contact members 46 and 47 to always resiliently contact the contact bars 36 and 45 when the heating element assembly A is adjustably moved up and down to various positions in the heating compartment 3 as more fully described hereinafter.

The contact bars 36 and 45 will be preferably located a sufficient distance from the anchorage support of the contact members 46 and 47 to provide the requisite length so that the contact members 46 and 47 may traverse the adjusted distances through which the heating element assembly A is moved.

The contact members 46 and 47 are provided at their contact ends with the flange portions 48 which extend substantially at right angles to the main body portion of the contact members 46 and 47 and further extend adjacent the edge portions of the contact bars 36 and 45 to retain the ends of the contact members 46 and 47 from moving transversely relative to the contact bars 36 and 45 to retain the ends and insure the ends of the contact members 46 and 47 to always travel longitudinally of the contact bars 36 and 45 as the heater element assembly A is raised or lowered in the cooking compartment 3, the contact members 46 and 47 each being provided with flange portions 49 which extend substantially parallel with the inside surface of one of the wall portions of the inner housing 2, the flange portions 49 each being adapted to fit between the flanges or extension portions 54 of each of the clip members 52, the clip members 52 being constructed of suitable material to provide insulation characteristics for assembly with the contact members 46 and 47 and for further connection with a source of electrical supply.

The adjacent wall portions of the outer housing 1 and the inner housing 2 will be provided with suitable openings 53 for receiving the extension portions 51 of the insulation or clip members 52 to prevent the insulation or clip members 52 from turning about the axis of the screws 55 which extend through suitable openings in the flange portions 49 and through the bores 56 of the bushings 57, the screws 55 further extending through the openings 58 in the clip members 52 and also through terminal members 59 which are suitably connected with cables or wires 60 which are connected with the source of electrical supply and which thus provide for a circuit flow of electrical current from the source of electrical supply through the contact members 46 and 47 and thus to the contact bars 36 and 45 and to the heating coils or element 29 in the heating element or assembly A.

The clip members 52 and the terminal members 59, as well as the flange portions 49 of the contact members 46 and 47 will be retained by the screws 55 which are secured by the nuts 61.

The spacers or bushings 62 may be assembled around the bushings 57 between adjacent wall portions of the outer housing 1 and the inner housing 2 to prevent distortion of said adjacent wall portions.

The insulation plate or members 63 are suitably secured to the upper wall portion of the housing 24 and will be positioned longitudinally between the flanges 35 of the bushings 34 and the flanges 44 of the bushings 43, the insulation member 63 being further positioned between the upper wall portion of the housing 24 and each of the contact bars 36 and 45 to prevent the resilient contact members 46 and 47 from engaging with the upper portion of the wall 24 and thus preventing short circuits.

The bracket members 64 and 65 are positioned within the cooking chamber 3 adjacent oppositely disposed side wall portions thereof and provide means for supporting the heating element assembly A, the brackets 64 and 65 being further supported as more fully described hereinafter.

The bracket members 64 and 65 are each provided with the flange portions 66 which extend within and engage the sides of the slot or grooves 67 which extends longitudinally of the insulation members 68 which engage and are supported by the upper wall portion of the housing 24 together with the brackets 69, each of which are provided with a flange portion extending above the insulation member 68, the bracket members 69 being further provided with a flange portion which is secured to the upper wall portion of the housing 24 by the screws 70, the brackets 69 together with the housing 24 thus forming a channel for retaining and supporting the insulating members 68 which are in turn slidably supported on the flange portion 66 of the brackets 64 and 65 and thus provide means for permitting the heating element assembly A to be slidably moved from its supported position on the brackets 64 and 65 and out of the cooking compartment 3 when desired for service requirements and to facilitate assembly thereof.

The grill or support member 71 is adapted to support the substances or objects to be cooked, such as meat, fowl, steaks, chops, game, or similar substances, while they are being broiled or cooked in the cooking compartment 3, the grill member 71 being provided with the frame member 72 which may be constructed of wire or similar material and extended peripherally around the grill member 71 and supporting a plurality of bar or rod members 73 which extend longitudinally therebetween and are suitably secured thereto at their ends, as by welding or by similar means, the rod or bar members 73 being further supported by a plurality of bar or rod members 74 extending transversely to the bar or rod members 73 and which are secured at their ends to the frame member 72, the rod or bar members 74 being further suitably secured as desired to the bar or rod members 73.

The frame member 72 is provided with the bent portions 75 at each of its sides which are adapted to slidably engage and be supported upon the brackets or members 76 and 77, each of the brackets 76 and 77 being provided with a horizontal flange for engaging and supporting the bent portions 75 of the frame member 71, the bent portions 75 thus allowing the bar or rod members 73 to be assembled and positioned substantially with their upper surfaces flush with the upper surfaces of the frame member 72 and permitting the bar or rod members 74 to be positioned below the rod or bar members 73, thus maintaining the upper surface of the grill member 71 substantially in one plane to facilitate the placement or removal of the substances to be cooked thereon.

The brackets 76 and 77 extend longitudinally adjacent the inner surfaces of oppositely disposed side wall portions of the cooking chamber 3 and are adapted to slidably engage same by being adjustably raised or lowered, the brackets 76 and 77 being supported on the rivet or stud members 78 and 79 respectively extending through and slidably operating in the slots 80 and 81 of the side wall portions of the cooking compartment 3 in the inner housing 2.

Fig. 4 discloses in detail and to a larger scale the mechanism which permits the raising and lowering of the grill member 71, Fig. 4 disclosing the mechanism located at one side of and in one of the spaces 5 between the wall portions of the inner housing 2 and the outer housing 1, the operating mechanism on the opposite side of the cooking chamber 3 being substantially identical.

Also the mechanism disclosed in Fig. 4 is similar and substantially identical to that utilized in raising and lowering the heating element assembly A and also as utilized for raising and lowering the charcoal pan assembly, all of which will be more fully described hereinafter.

It is believed that disclosure of one of the lever operating mechanisms at one side of the cooking chamber and for one of the adjustable assemblies in the cooking compartment 3 is sufficient to clarify the principles of operation of all of the lever operating mechanisms as utilized for raising and lowering each of the various adjustable assemblies, namely the heating element assembly A, the grill member 71, and the charcoal receptacle 127.

The brackets 76 and 77 are indicated in their normal or neutral positions by the dotted lines 82 in Fig. 4 and thus indicate the normal or neutral position of the grill member 71 when supported thereon.

The brackets 76 and 77 are each provided with the slots 83 and 84 which permit the rivets or studs 78 and 79 to move therein to accommodate their positions to the pivotal movement of the arm members 85 and 86, and at the same time to allow the brackets 76 and 77 together with the grill 71 supported thereon to move in a straight up and down direction or plane in the cooking chamber 3, the rivets or studs 78 and 79 being constrained to respectively follow the curvature of the slots 80 and 81.

The arm member 86 is pivotally mounted on the rivet or stud 87 which is fixedly mounted in the side wall portion of the inner housing 2, thus providing a fixed pivot point for the pivotal movement of the arm member 86. In the same way the arm member 85 is pivotally mounted on the rivet or stud 88 which is fixedly mounted in one of the bracket or plate members 89, each of which is provided with an offset portion 90 which is suitably secured to the outside surfaces of the side wall portions of the inner housing 2 as by spot welding or similar means, the offset portion or construction of the bracket members 89 permitting the arm members 85 and 86 to pass each other to raise and lower the bracket members 76 and 77 to positions above and below a plane extending through the rivets or studs 87 and 88.

The rivets or studs 91 each extend through the arm members 85 and 86 as well as each of the lever members 92 and 93 of each of the lever operating mechanisms, the lever members 92 and 93 each extending through one of the spaces 5, each of the lever members 92 and 93 being pivotally mounted on a fixed pivot provided by the rivets or studs 94 which are fixedly mounted in the outer side wall portions of the outer housing 1, the lever members 92 and 93 being spaced therefrom by the members 95 which thus provide an operating clearance space between the outer sides of the lever members 92 and 93 and the inside surfaces of the outer wall portions of the outer housing 1. The rivets or studs 91 thus connect the lever member 92 or 93 with one pair of arms 85 and 86, each of the arm members 85 being provided with a slot 96 and each of the arm members 86 being provided with a slot 97 to accommodate the displacement of the arms 85 and 86 relative to the rivet or stud 91 which is constrained to move in a straight line in an up and down direction by the slot 98 which is formed in each of the oppositely disposed side wall portions of the inner housing 2.

The lever members 92 and 93 are also each provided with the plate member 152 which may be secured thereto as by welding or similar means, the plate 152 further providing means for respectively spacing the lever members 92 and 93 from the arm members 85 and 86 and to accommodate which extend between said lever and said arm members.

The lever members 92 and 93 extend to points adjacent the open side or door opening 20 of the broiler mechanism and each pair of said lever members 92 and 93 are connected by a rod member 99 which is provided with extension portions 100 at each of its ends and of smaller diameter than the normal diameter of the rod member 99, the extension portions 100 being adapted to extend through suitable openings in the lever members 92 and 93 and to be riveted over as at 101.

In order to protect the hands of the operator, the bar member 99 is covered with the tubular member 102 which is constructed of asbestos or similar heat resisting material, the tubular member 102 being spaced at its ends from each pair of lever members 92 and 93 by the bushing members 103 which are each provided with the flange portion 104 for abutting the end of the tubular member 102, thus providing for a smaller diameter of the bushings 103 for passing through slots 105 in the oppositely disposed side wall portions of the inner housing 2 at points adjacent the open side or door opening 20 of the broiler mechanism.

It is to be here noted that the movement of the tubular member 102, as disclosed in Fig. 4, in an upper direction will cause the brackets 76 and 77, together with their supported grill member 71, to move upwardly substantially from the position indicated by the dotted lines 82 in Fig. 4 to the position indicated by the dotted lines 106 in Fig. 4.

Also the downward movement of the tubular member 102, as disclosed in Fig. 4, will cause the bracket members 76 and 77 together with the supported grill member 71 to be moved downwardly from the position indicated by the dotted lines 82 to the position indicated by the dotted lines 107, Fig. 4 thus clearly showing the various operating positions of the grill member and of the raising and lowering mechanism therefor.

Fig. 10 discloses a side view of one of the lever members 92 or 93 together with a hole or opening 108 at one of its ends for mounting on the rivets or studs 94, the lever members 92 and 93 each being further provided with a hole or opening 109 at its other end for receiving one of the extension portions 100 of the bar member 99.

Also the lever arms 92 and 93 are each provided with a slot 110 for receiving the rivet or stud 91 therethrough and to permit the pivotal movement of the lever members 92 and 93 to operate with and act as a guide for the head 91A of the rivet or stud 91 which travels in a straight up and down direction in the slot 98.

In order to position the brackets 76 and 77, together with the grill member 71 in various adjusted positions the plate or bracket members 111 are suitably secured and mounted on the flange portions 90 of the brackets 89 and are each provided with the plurality of index grooves or portions 112, the grooves or index portions 112 being arranged in radial formation to accommodate the radial movement of the lever members 92 and 93.

The members 113 are provided with an opening 114 therethrough for receiving and surrounding the bushing 103, one of the brackets or members 113 being assembled on each of the lever members 92 and 93 adjacent their outer ends, the bracket members 113 each being provided with the clip portions 115 which extend around and engage the lever members 92 and 93 to further secure the brackets or members 113 thereon and to insure said brackets or members 113 to pivotally move with the lever members 92 and 93, as disclosed in Figs. 14, 15, 16 and 17.

Also the brackets or members 113 are each provided with raised or displaced portions 116 between their end support portions, the raised portions 116 each being provided with oppositely disposed side portions 117 which are each provided with extension portions 118 to act as clip members for engaging the lever members 92 and 93 and to limit the outward movement of the plurality of index portions 119 which are adapted to resiliently engage the index portions 112 of the brackets 113, the bracket members 113 each being provided with resilient characteristics in the raised portion 116 to allow the plurality of index portions 119 to be forced outwardly and to slide over the inside surfaces of the brackets 111 to engage with the index portions 112 of the index brackets 111, thus operating as a rack or ratchet mechanism to position the brackets 76 and 77 together with the supported grill member 71 in a selective position in an up and down direction in the cooking compartment 3.

It is to be noted that the operating mechanism as installed in cooperation with the heating element assembly A will be provided with a handle assembly comprising the bar 99, the tubular member 102, and the bushing 103, said handle assembly being designated at 122, in Fig. 2, to differentiate from the handle assemblies of the other adjustably operated mechanisms in the cooking compartment 3. Also the grill member 71 will be provided with a similar handle assembly 123.

It is also to be noted that the slots 120 and 121 will extend for approximately one half the vertical distance of the slots 80 and 81 for the reason that the heating element assembly A is normally located at the upper end portion of the cooking compartment 3 and it is therefore necessary only to raise and lower the heating element assembly A substantially one half of the total upward and downward movement of the grill member 71, it never being necessary to raise the heating element assembly A above the position disclosed in Fig. 2 in which it is positioned adjacent the upper wall portion of the inner housing 2 and of the cooking compartment 3.

It is also to be noted that the lever members 92 and 93, as utilized in the operating mechanism for raising and lowering the heating element assembly A will be each provided with the offset portion 124 which will position the handle assembly 122 below the upper wall portion of the broiler mechanism to provide hand room between the handle assembly 122 and the upper wall portions of the broiler mechanism when the heating element assembly A is in its uppermost position in the cooking compartment 3.

Also it is to be noted that slots 126 will be provided in oppositely disposed side wall portions of the inner housing 2 to accommodate the pivotal movement of the handle assembly 122, the slots 126 intersecting the upper portions of the slots 105.

The receptacle or pan 127 is provided with the oppositely disposed flange portions 128 which rest upon and are adapted to slidably engage the flange portions 129 of the bracket members 130 and 131 which are similar to the bracket members 76 and 77 for supporting the grill member 71, the brackets 130 and 131 thus providing support for the receptacle or pan 127. Also suitable clips 130A may be utilized to locate the receptacle or pan 127 endwise.

The receptacle or pan 127 is adapted to contain a supply of charcoal 132 or similar fuel which is retained in the receptacle or pan 127 beneath the grill member 71 so that the heat developed by the burning charcoal 132 will rise upwardly and broil or cook any substances placed on the grill member 71.

The receptacle or pan 127 is provided with the layer or mass of absorbent and non-inflammable material, such as ashes, sand, plaster or similar substances, which is constructed as a layer or liner assembly B covering the bottom surface of the receptacle or pan 127. The liner assembly B is constructed of layers 133 and 134 of the absorbent and non-inflammable material, said layers being formed by molding the absorbent and non-inflammable material while in a plastic state to form layers 133 and 134 which may be reinforced by providing one or more layers of screen or similar material 135 between the layers 133 and 134, the plastic material of the composition extending through and engaging the screen member 135 to cause the layers 133 and 134 to connect with the screen material 135 and thus providing a stronger liner assembly B.

The absorbent and non-inflammable characteristics of the liner assembly B will enable any drippings or fat from the substances being cooked to fall through the grill member 71 and be caught and deposited on the liner assembly B where such drippings will be burned and in conjunction with the charcoal 132 will provide a proportion of the fuel necessary to broil or cook the substances supported on the grill member 71.

Figure 9 discloses the construction of the receptacle or pan 127 and the liner assembly B in detail together with drippings 136 which have fallen through the grill member 71 on to the liner assembly B and are being burned thereon, thus adding their heat to that developed by the burning charcoal 132 and thus providing means for getting rid of the drippings as well as utilizing them as part of the fuel for cooking the substances on the grill member 71.

It is to be noted that as the drippings 136 fall upon the liner assembly B, a certain proportion of them will be absorbed by the liner assembly B and will be caused to burn slowly so that the burning of the drippings 136 will not cause too great a flame instantaneously.

Also the charcoal 132 may be moved by the operator by means of a suitable tool such as a poker or similar tool so that the charcoal 132 will be piled on the upper surface of the liner assembly B in the receptacle or pan 127 in positions away from the drippings 136 which also further tend to eliminate too great a flame by the sudden burning of large masses of drippings 136.

Also to further check and control the burning of the drippings 136 or fat which has dropped from the substances on the grill member 71 during the cooking operation, and also to control the charcoal 132 to burn slowly and to conserve it as fuel and to retain the broiler mechanism in economical operation, I provide a plurality of holes or openings 137 which extend upwardly through the layers 133 and 134 and also are connected with the openings 138 which extend through the bottom of the receptacle or pan 127, said openings permitting a liquid, such as water, to pass upwardly through the openings 138 and 137 and also through the screen member 135 to the upper surface of the liner assembly B and on to the charcoal 132 when the receptacle or pan 127 is submerged or partially submerged in a receptacle of said water or similar liquid.

In order to provide a supply of water or similar liquid, I utilize the pan member 139 which is disclosed in Figs. 1 and 2 as being located at the bottom of the cooking compartment 3 and resting upon the upper surface of the wall portion 8, the pan 139 engaging the rear wall of the cooking compartment 3 and being retained in a proper assembled position by the bracket 140 which is suitably secured to the wall portion 8, as by welding or similar means, the bracket 140 being provided with the flange portion 141 for engaging the front wall of the pan member 139 and which extends upwardly and therefrom with its upper end portion 142 inclined outwardly at an angle to permit the pan 127 to be raised by the handle member 143, suitably secured to the pan 127, the pan member thus being readily removable from the cooking compartment 3.

Also to render the water or similar liquid 144 more effective for absorption by the liner assembly B and to provide for thinning of the drippings or fat 136 and to render said drippings or fat 136 more readily absorbed by the material of the liner assembly B, I mix or dissolve a small portion of bicarbonate of soda in the water or liquid 144 to provide a composition which has effervescent, bubbling, or foaming characteristics and which will cause the water or liquid 144 to foam and to flow through and spread over the liner assembly B and to cause the drippings or fat 136 to assume a thinner consistency and to be more readily absorbed by the composition of the liner assembly B and thus to more effectively control the burning of the drippings or fat 136 as well as the charcoal 132 to take place at the desired rate of speed to attain the greatest economy.

The outwardly inclined portion 142 of the bracket 140 also facilitates the entrance or assembly of the pan 139 into the compartment 3 as the pan will tend to ride down over the portion 142 into its proper position on the wall portion 8.

The pan 139 will be filled with water to substantially the height indicated at 144 in Fig. 1. The size of the pan 139 will be sufficient to allow the outside of the receptacle or pan 127 to be inserted therein as indicated by the dotted lines 145 in Fig. 2, the upper edge portions of the pan 139 being provided with the chamfered portion 146 extending therearound to facilitate the entrance of the pan or receptacle 127 therein. As the pan 127 is lowered into the pan or receptacle 139 the water will flow upwardly through the openings 138 and 137 and on to the charcoal 132, a certain proportion of the water being absorbed by the liner assembly B, thus tending to cut down the time in which the charcoal 132 and drippings 136 will burn, or in other words, to control the burning of the charcoal 132 and drippings 136 to burn slowly to avoid excessive high flames and also to provide economical utilization of the fuel in the broiler mechanism.

It is to be understood that the receptacle or pan 127 will be slidably supported on the brackets 130 and 131 which are provided with a lever operating mechanism similar to that above described relative to the heating element assembly A and the grill member 71, one of the bar members 99 and one of the tubular members 102 together with the bushing member 103 forming the handle assembly designated by the numeral 147, in Fig. 2, for operating the lever mechanism to raise and lower the receptacle 127, the oppositely disposed side walls of the cooking chamber 3 being provided with the slots 148 for receiving the bar 99 therethrough, the slots 148 intersecting the slots 105.

Also the oppositely disposed side walls of the cooking compartment 3 will be provided with the slots 149 and 150 for receiving the rivets or studs 78 and 79 of the operating mechanism therein, the slot 149 intersecting the slot 80 which is provided for the rivet or stud 78 of the operating mechanism for the grill member 71, the slot 150 also intersectiong the slot 81 provided for the rivet or stud member 79 of the lever mechanism for operating the grill member 71.

Also it is to be noted that as disclosed in Figs. 27 and 28, if it is desired to support the grill member 71 in a manner that will enable the grill member 71 to be partially removed from the cooking compartment 3 and at the same time to support the grill member 71 so that it may in turn support substances placed thereon for the cooking operation, the bracket members 153 may be provided in place of the brackets 76 and 77, the brackets 153 being constructed of the angle irons 154 and 155 which may be suitably secured thereto, as by welding or similar means, the angle irons 154 each being provided with a flange portion 156 which is spaced from the flange portion 157 of the angle iron 155 so that the grill member 71 may be inserted in the slot 158 between the flange portions 156 and 157, thus permitting the grill member 71 to be supported in a partially removed position relative to the brackets 153 and at the same time permitting the grill member to support substances therein, thus facilitating the placement and removal of the substances being cooked from the grill member 71.

The flange portions 157 may be each constructed with the angular portion 159 at its outer or front end to form a bell mouth opening for receiving the grill member 71 to facilitate its entrance therein.

Fig. 29 discloses a gas or cook stove 160 as used in conventional kitchen equipment of households, the gas stove 160 being provided with burners 161 together with handle operating valve mechanisms indicated at 162, the gas stove 160 being further provided with a conventional oven 163 which is disclosed with its door in an open position to show my broiler mechanism installed therein and designed to operate with conventional gas or similar stove mechanisms such as 160.

The broiler assembly D is provided with an outer housing 164 and an inner housing 165 assembled in a manner similar to that disclosed in the broiler assembly C, the outer housing 164 and the inner housing 165 being assembled to provide oppositely disposed sides of the broiler mechanism assembly D together with the cooking compartment 168 therebetween, the compartment 168, however, being open at its upper end instead of being closed as disclosed in the broiler assembly C, the cooking compartment 168 being open at its upper end to receive the heat therein as developed by the burners 169 with which the oven 163 is conventionally equipped.

The grill member 170 is mounted on the brackets 171 and 172 which are operated by mechanism similar to that disclosed in my broiler assembly C and particularly described and disclosed in Fig. 4, one only of the lever operating mechanism being utilized at one side only of the cooking compartment 168 in the operating space 167 because of the relatively small size of the broiler assembly D.

One set of the lever operating mechanisms 173 similar to that disclosed in Fig. 4 is sufficient to raise and lower the grill member 170 in the cooking compartment 168. Also in a similar manner the receptacle or pan member 174 will be supported on the brackets 175 and 176 and will be operated by the lever operating mechanism 177 similar to that disclosed in Fig. 4.

Also in a similar manner, the receptacle or pan 178 will be mounted at the bottom of the cooking compartment 168 for containing water or similar liquid for receiving the receptacle or pan 174 therein and to overflow and be absorbed by the liner assembly E upon which is supported the charcoal 132. The broiler assembly D will be provided with leg portions 178 for resting upon the bottom surface of the main cooking compartment of the oven 163 of the gas stove 160 and if desired, may be provided with casters 190 to render the broiler assembly readily portable.

The broiler mechanism D will be provided with the slot 180 through which the handle member 173 extends and operates, the broiler assembly D also being further provided with the slot 181 through which the handle member 177 extends and operates.

Figure 30 discloses a sectional view of the broiler assembly D taken on the line 30—30, Fig. 29, to disclose in a general way one of the sets of lever operating mechanisms for raising and lowering the grill member 170 to and from the burners 169, the design of the lever operating mechanism connected with the handle member 173 being similar to that utilized in connection with the handle 177 for operating the pan 174 to raise and lower it to and from the grill member 170 in the cooking compartment 168.

It is to be noted that instead of providing a lever operating mechanism in the compartment or space 166 between the side walls of the inner housing 165 and the outer housing 164, the bar or rod 182 will extend through the space 183 between the rear wall portions of the broiler assembly D to operatively connect with the lever 171.

It is to be noted that the heating element assembly A may be adjustably moved in an up and down direction in the cooking compartment 3 which, together with the adjustable operation of the receptacle or pan 127, will provide means whereby the charcoal 132 supported on the liner assembly B of the pan 127 and the heating element assembly A may be operatively moved to adjacent positions and by removal of the grill member 71, the charcoal 132 thus being brought to a sufficiently close position adjacent the heating element or coils 29 so that the charcoal 132 may be ignited by means of the heat developed by the heating coils 29.

Also it is to be noted that the ability to move the heating element assembly A, together with the grill member 71, in an up and down direction in the cooking compartment 3, will permit my broiler mechanism assembly C to be used as a toaster mechanism, the slices of bread being placed on the grill member 71 and thus being possible of positioning at the proper distance from the heating coils 29 to provide for the necessary amount of heat to toast the upper portion of the slices of bread, and at the same time the pan 127 may be adjustably moved to the required distance from and below the grill member 71 so that the heat developed by the burning charcoal 132 will toast the underside of the bread, the bread being toasted simultaneously from its upper and bottom sides and accomplishing a very efficient and economical toasting operation of bread or similar material in my broiler assembly C.

Also the same toasting operation may be accomplished in the broiler assembly D, as disclosed in Figs. 29 and 30, in a similar manner to that above described by adjustment of the grill member 174 relative to the burners 169.

It is also to be noted that my boiler assemblies are especially adapted for the cooking of lobsters and which permit the lobsters to be cooked without constantly turning them over and therefore making it possible for all of the original liquors of the lobster to remain in the body or shell of the lobster, thus adding greatly to the taste of the lobster when cooked, this not being possible of accomplishment with conventional broiler mechanisms.

The container assembly E, disclosed in Figs. 31, 32 and 33, is provided with oppositely disposed flange portions 128 which are adapted to rest upon and slidably engage the flange portions 129 of the brackets 130 and 131 of the broiler mechanism C in a manner similar to the receptacle or pan 127, when it is desired to adjustably support and operate the container assembly E. Also the container assembly E is adapted to be used, as desired, by supporting it on the bottom of the cooking compartment 3 of the broiler mechanism C in a manner similar to the pan member 139 as disclosed in Figs. 1 and 2, when it is desired to utilize the container assembly E in a fixed position and in which case the receptacle or pan 127 would not be utilized, the grill member 71 being positioned so that it may be adjustably moved to the proper height above the container assembly E to permit the substance or unit being cooked to be exposed to the desired amount of heat developed by charcoal or similar fuel supported on the container assembly E.

The container assembly E is constructed to provide the chamber or reservoir 195, the upper wall 196 of which is inclined downwardly toward one end of the container assembly E, the upper wall 196 providing a support for charcoal or similar fuel and allowing the charcoal or similar fuel to be moved about to various positions along and upon the inclined supporting surface of the wall portion 196 to provide further means for varying the amount of heat desired in the cooking operation in accordance with the distance between the charcoal or similar fuel and the substance to be cooked and which is supported on the grill member 71.

In order to protect the upper wall portion 196 and to adapt it for supporting the charcoal or similar fuel the liner or layer 197 is mounted on and suitably secured to the upper wall portion 196, the liner or layer 197 being similar in construction and characteristics to the liner assembly B, disclosed in Figs. 1 and 9. The liner or layer 197 is provided with the flanges 198 at its sides and if desired they may extend across the inner ends thereof to retain the charcoal or similar fuel thereon.

The container assembly E is provided with its maximum depth of chamber or reservoir 195 at its outer or front end as at 199, the upper wall portion of the end 199 being provided with the filler spout 200, which is preferably rectangular in shape to permit the reception of various shapes of filler members containing liquid for replenishing the liquid in the chamber or reservoir 195, the filler spout 200 being provided with the movably mounted cover 201, the filler spout 200 being further preferably located at one side of the container assembly E to facilitate the replenishment and positioning of the charcoal or similar fuel.

The container assembly E is provided with the handle member 202 attached to the end 199. A supply of charcoal is indicated at 203 on the liner or layer 197.

Figs. 34, 35 and 36 disclose a grill member 204 which is adapted to be supported on the brackets 76 and 77 in place of the grill member 71, Figs. 1 and 3, said grill member 204 being adapted to utilize means for clamping a substance or unit to be cooked in a fixed position during the cooking or broiling operation.

The grill member 204 is provided with a plurality of rod or bar members 205 which are suitably secured to the frame member 206 which extends around the grill member 204, the rod or bar members 205 being further suitably secured to the rod or bar members 207 which extend transversely to the rod or bar members 205 and are also suitably secured to the frame member 206, the grill member 204 thus being similar in construction to the grill member 71, in Figs. 1 and 3. The outer or front ends of the rod or bar members 205 of the grill member 206 are similar in construction and assembly with the grill member 71, in Figs. 1 and 3 and are secured to the rod or bar member 208 which extends parallel with and adjacent the outer or front side of the frame member 206 to provide the space 209 therebetween.

Also the inner or rear portion of the frame member 206 is provided with the upstanding arms 210 which are provided with the eye portions 211 which are adapted to act as guide members for receiving the extension portions 212 of the rod or bar members 213 of the clamp member 214, which is disclosed in Figs. 34 and 35, as being mounted on the grill member 204 and cooperating therewith to clamp and hold a lobster 215 in a fixed position for the cooking or broiling operation.

The clamp member 214 is provided with the frame member 216 extending therearound and to which are suitably secured the rod or bar members 217 extending transversely to the rod or bar members 213 and to which they are also suitably secured. The rod or bar members 213 are also suitably secured to the front and rear portions of the frame member 216, the rod or bar members 213 being connected at their outer or front ends by the portion 218 which is bent downwardly to pass under the outer or front portion of the frame member 206 and to enter the space 209, the bent portions of the rod or bar members 213 engaging the outer or front portion of the frame member 206, the clamp member 214 being anchored in the eye portions 211 and possessing sufficient resilient characteristics to allow the portion 218 to be sprung under the outer or front portion of the frame member 206 to clamp the lobster 215 or similar unit or substance on the grill member 204.

The clamp member 214 may extend for a portion of the width of the grill member 204, as disclosed in Fig. 34, thus leaving a portion of the grill member 204 free for use without the clamp member 214, or the grill member 204 may be provided with a series of eye portions 211 to permit the clamp member 214 to be shifted to different areas of the grill member 204, or a plurality of clamp members 214 may be used in association with the grill member 204.

In operation the substances to be broiled or cooked are placed on the grill members 71, 170 or 204.

Figs. 1 and 3 disclose the various substances or objects located on the grill member 71, a fowl being indicated by the dotted lines 184 and a plurality of steaks being indicated by the lines 185.

Also the dotted lines 186, Fig. 3, indicate conventional chops being broiled or cooked.

If the broiling mechanism is not being continually used and is therefore not lighted, the charcoal 132 may be ignited by removing the grill member 71 prior to placing the meats or other substances to be cooked thereon, and the receptacle or pan 127 may be raised while the heating element assembly A may be lowered to sufficiently close positions relative to one another so that the heat developed by the coils 29 will immediately ignite the charcoal after which the heating element assembly A may be raised to its normal position at the top of the cooking compartment 3, as disclosed in Fig. 2 and the pan 127 may be lowered to its desired distance below the heating element assembly A and then the grill 71 may be reinserted and the meat or substance placed thereon, as above disclosed.

The heating coils 29 are electrically connected to the contact bars 36 and 45, the contact members 46 and 47, together with the cables 60 which are in turn connected with a source of electrical supply, thus providing a circuit for the flow of the electrical current through the heating coils 29 to develop said heat which will be radiated downwardly on the substances or objects to be cooked and which are supported on the grill member 71, thus providing means for cooking the upper sides of the substances or objects.

The positioning of the heating element assembly A and the grill member 71 will each be accomplished by one of the lever mechanisms disclosed in detail in Fig. 4 and in which the handle assembly 123 is disclosed for the grill member 71.

The operator grasps the handle assembly 123 and by raising it or lowering it will cause the lever members 92 and 93 to pivotally move on the rivets or studs 94 which will in turn cause the arm member 85 to move about its pivot center on the stud or pin 88 supported by the brackets 90 while the arm member 86 pivotally moves about its pivot center on the rivet or stud 87 supported on the side walls of the inner housing 2, the arm members 85 and 86 thus raising or lowering the brackets 76 and 77 to position the grill member 71 at the desired height.

In a similar way the handle assembly 147 will operate to raise and lower the receptacle or pan 127 which supports the charcoal 132 on the liner assembly B.

The charcoal 132 is moved by the operator by means of a poker or similar tool to any section of the grill member as desired to prevent too rapid burning off of the fat or drippings 136 from the substance or objects being cooked.

The substance or object on the grill member 71 will now be broiled or cooked from its opposite sides by the heat developed by a heating element assembly A, located above the grill member 71, together with the charcoal 132 located below the grill member 71.

The instantaneous application of the heat above and below the substances or objects being broiled or cooked will quickly seal the pores of said substances or objects so that all juices are held therewithin to improve the flavor of said substances and objects and to prevent the curling thereof which would happen if heat was first applied to the top and then afterwards to the bottom surface as is the case in conventional broiler mechanisms.

The even application of the heat above and below the substances or objects being cooked thus insures that no real red blood or juice from the substances or objects being cooked are lost during the cooking operation, as is the case in the conventional way of cooking at the present time in which one side of the substances or objects are coked one at a time, thus insuring in my broiler mechanism that only the clear rendered drippings or fat 136 will be forced out of the substance or objects being cooked and these will drop on to the upper surface of the liner assembly B, which may be kept clear of the charcoal by the operator so that the drippings or fat will be melted and thinned and caused to run over the upper surface of the liner assembly B so that they will be absorbed by the composition material of the liner assembly B as above disclosed. Then to insure that the burning of the drippings or fat 136 and the charcoal 132 may not be accomplished too quickly to cause excessive flames and heat, the operator by grasping the handle 147 may lower the pan 127 into the pan or receptacle 139 so that the receptacle or pan 127 will extend into the water or liquid 144 sufficiently to allow the water or liquid 144, together with the bicarbonate of soda contained therein to flow through the openings 137 and 138 and to contact the drippings 136 and the charcoal 132 and thus cut down or control the time in which the drippings or fat 136 and charcoal 132 is being burned, thus controlling the combustion at the most efficient flame to properly broil or cook the substances or objects being cooked at their lower side by the charcoal 132 and also to utilize the drippings or fat 136 for developing heat by burning them to best advantage so that a lesser amount of electrical current is required to develop heat in the coils 29, as well as a lesser amount of charcoal, thus not only providing means whereby the drippings and fat are eliminated but also utilizing them as fuel to cut down or decrease the cost of operation.

It is also to be noted that the broiler assembly D will be operated in a similar way, the broiler assembly D being readily portable and when it is desired to use it with the gas stove of the conventional kitchen equipment, the broiler assembly D being placed in the oven of the gas stove and then the grill member 170 and the receptacle or pans 174 and 178 may be operated by the mechanism disclosed in Fig. 29 in a similar way to that of the broiler assembly C.

The means for developing the heat for the upper burner, however, will be utilized by placing the broiler assembly D beneath the conventional burners 169 of the gas stove 160.

Also the broiler assembly D may be readily and economically utilized in conjunction with an electrically operated stove provided with coils connected with a source of supply of electric current, said broiler assembly D being located below said coils instead of the burners 169.

Also the container assembly E disclosed in Figs. 31, 32 and 33 may be utilized as desired in the broiler mechanism C in place of the receptacle or pan 127 and when the container assembly E is so used the fuel or similar charcoal is supported on the supporters indicated in Figs. 2 and 3 on the inclined surface of the chamber assembly E where it may be moved up or down the inclined surface to bring the fuel to positions closer or farther away from the substances which are being broiled.

The reservoir 195 is filled to the desired heighth with water or a similar liquid as described in conjunction with the receptacle 139 to provide for slow and proper burning of the charcoal 203, the liquid being replenished through the filler spout 200 as required.

Also when it is desired to utilize the grill member 204 this may be supported in place of the grill members 71 in Figs. 1 and 2 and after the lobster 215 or similar substance to be cooked is placed on the grill member 204, the clamp member 214 is placed thereon with its extension portions 212 within the eye portions 211 of the grill 204, and then the portion 218 of the clamp member 214 is bent downwardly to pass under the outer or front portion of the frame member 206 to enter the space 209, the bent portion 218, by its resilient characteristics, thus retaining the clamp member 214 in a position to clamp and hold the lobster 215 or similar substance between the clamp member 214 and the grill 204.

I claim:

1. In a broiler mechanism, the combination of a housing provided with a cooking compartment, provided with a ventilator opening in its upper portion, a member movably mounted on said housing and adapted to close said ventilator opening of said cooking compartment, a grill supported in said cooking compartment, and adapted to support the substance being cooked, a means for adjustably raising and lowering said grill in said cooking compartment, a charcoal burning support mechanism supported in said cooking compartment and positioned below said grill, a second means for adjustably raising and lowering said charcoal burning support mechanism in said cooking compartment and a receptacle supported in said cooking compartment and containing a liquid for absorption by said charcoal burning support mechanism to provide slow burning of the charcoal, said receptacle being adapted to receive said charcoal burning support mechanism therein to engage said liquid.

2. In a broiler mechanism, the combination of a grill member, bracket members supporting said grill member, a pair of pivotally mounted levers oppositely disposed about said grill member and connected by a handle portion, and a pair of oppositely disposed pairs of arm members each pivotally mounted at one of its ends and pivotally connected at its other end to one of said bracket members, and means for connecting each of said oppositely disposed pairs of arm members to one of said pivotally mounted levers, said pivotally mounted levers enabling said grill member to be moved above and below the pivot centers of said pivotally mounted levers.

3. In a broiler mechanism, the combination of a heater element, a grill for supporting a substance to be cooked, heat developing means for catching drippings from the substance to be cooked, said heat developing means being provided with a liner member having non-inflammable and absorbent characteristics, and means for applying material to said liner member to prevent rapid burning of said drippings.

4. In a broiler mechanism, the combination of a receptacle provided with openings in its bottom wall portions, a mass of material in said receptacle for catching drippings from a substance being broiled and provided with openings therein, and a second receptacle of liquid adapted to receive said first mentioned receptacle therein to allow said mass of material to absorb liquid from said second receptacle.

5. In a broiler mechanism, the combination of a cooking compartment, a pair of lever members pivotally mounted on oppositely disposed walls of said cooking compartment, a handle member connecting said pair of lever members and provided with a covering of material, said covering of material being provided with heat resisting characteristics, a pair of arm members pivotally connected each at one of its ends to oppositely disposed walls of said cooking compartment, bracket members mounted on oppositely disposed walls of said cooking compartment, a second pair of arm members pivotally connected each at one of its ends to one of said bracket members, means connecting said pair of lever members with said first mentioned and said second pairs of arm members, a pair of support members pivotally connected to the other ends of each of said first mentioned and said second pairs of arm members, and a grill member mounted on said pair of support members, said grill member supporting a substance to be broiled in said cooking compartment.

6. In a broiler mechanism, the combination of a cooking compartment, a pair of lever members pivotally mounted on oppositely disposed walls of said cooking compartment, a handle member connecting said pair of lever members and provided with a covering of material having heat resisting characteristics, a pair of arm members pivotally connected each at one of its ends to oppositely disposed walls of said cooking compartment, bracket members mounted on oppositely disposed walls of said cooking compartment, a second pair of arm members pivotally connected each at one of its ends to one of said bracket members, means connecting said pair of lever members with said first mentioned and said second pairs of arm members, a pair of support members pivotally connected to the other ends of each of said first mentioned and said second pairs of arm members, and a receptacle for containing fuel mounted on said pair of support members, said receptacle being provided with means for controlling the burning of drippings from a substance being broiled in said cooking compartment.

7. In a broiler mechanism, the combination of a cooking compartment, a pair of lever members pivotally mounted on oppositely disposed walls of said cooking compartment, a handle member connecting said pair of lever members and provided with a covering of material having heat resisting characteristics, a pair of arm members pivotally connected each at one of its ends to oppositely disposed walls of said cooking compartment, bracket members mounted on oppositely disposed walls of said cooking compartment, a second pair of arm members pivotally connected each at one of its ends to one of said bracket members, means connecting said pair of lever members with said first mentioned and said second pairs of arm members, a pair of support members pivotally connected to the other ends of each of said first mentioned and said second pairs of arm members, a grill member mounted on said pair of support members, said grill member supporting a substance to be broiled in said cooking compartment, a bracket means provided with index portions, and plunger mechanism mounted on said pair of lever members for engaging said bracket means to position said grill member in adjusted positions.

8. In a broiler mechanism for use in a stove having a burner element mounted in an oven, the combination of a housing have an open side adjacent the burner element in said oven, a grill member mounted in said housing, a charcoal burning mechanism mounted in said housing below said grill member, means for adjustably moving said grill member to and from the open side of said housing, and a second means for adjustably moving said charcoal burning mechanism to and from said grill member.

9. In a broiler mechanism, the combination of a heater element, a grill member for supporting the substance to be cooked below said heater element and provided with a pair of upstanding arms each provided with an eye portion, a clamp member having extensions adapted to enter said eye portions of said grill member, said clamp member being provided with a bent portion engaging said grill member to cause said clamp member to clamp said substance against said grill member, and heat developing means below said grill member and adapted to catch drippings from said substance.

10. In a broiler mechanism, the combination of a grill member for supporting the substance to be broiled and provided with a frame member extending therearound together with a cross bar extending substantially parallel with the front portion of said frame member, said grill member being further provided with bars extending substantially at right angles to and secured to one another and to said frame member, a portion of said bars being secured to said cross bar extending substantially parallel with the front portion of said frame member, said frame member being provided with upstanding arms each provided with eye portions, and a clamp member provided with a frame member together with bars extending substantially at right angles to and secured to one another and to said frame member, a portion of said bars of said clamp members being provided with extension portions extending within said eye portions of said grill member, said clamp member being provided with a bent portion connecting the outer ends of a portion of said bars thereof and adapted to engage said frame member of said grill member adjacent said cross bar extending substantially parallel with the front portion of said frame member of said grill member, to cause said clamp member to clamp said tances relative to said grill member.

11. In a broiler mechanism, the combination of a heater element, a grill member mounted below said heater element, a container assembly mounted below said grill member and provided with an inclined upper wall, said container assembly being adapted to contain a liquid, and a liner member on said inclined upper wall of said container assembly and having non-inflammable and absorbent characteristics, said liner being adapted to support charcoal or similar fuel at varying distances relative to said grill member.

12. In a broiler mechanism, the combination of a tank adapted to contain a liquid and provided with an inclined upper wall together with flange portions adjacent the edges thereof, said tank being provided with a filler spout, a liner member on said inclined upper wall of said tank and having non-inflammable and absorbent characteristics, said liner member being adapted to support charcoal or similar fuel thereon while being burned in the broiling operation and a cover member for closing said filler spout of said tank.

LOUIS ALBERT BABIN.